United States Patent
Philbrick

(10) Patent No.: US 7,755,341 B2
(45) Date of Patent: Jul. 13, 2010

(54) STEADY STATE FREQUENCY CONTROL OF VARIABLE FREQUENCY SWITCHING REGULATORS

(75) Inventor: Rhys S. A. Philbrick, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 297 days.

(21) Appl. No.: 12/046,342

(22) Filed: Mar. 11, 2008

(65) Prior Publication Data

US 2009/0009148 A1      Jan. 8, 2009

Related U.S. Application Data

(60) Provisional application No. 60/948,077, filed on Jul. 5, 2007.

(51) Int. Cl.
  *G05F 5/00* (2006.01)
  *G05F 1/44* (2006.01)
(52) U.S. Cl. .............. 323/282; 323/284; 323/299; 323/300
(58) Field of Classification Search ............. 323/282, 323/284, 285, 299, 300
  See application file for complete search history.

(56) References Cited

U.S. PATENT DOCUMENTS

| | | | | |
|---|---|---|---|---|
| 4,207,539 A | | 6/1980 | Minakuchi | |
| 4,940,929 A | * | 7/1990 | Williams | 323/222 |
| 5,414,390 A | | 5/1995 | Kovacs et al. | |
| 5,548,206 A | * | 8/1996 | Soo | 323/284 |
| 5,696,468 A | | 12/1997 | Nise | |
| 6,133,770 A | | 10/2000 | Hasegawa | |
| 6,229,289 B1 | * | 5/2001 | Piovaccari et al. | 323/268 |
| 6,366,070 B1 | * | 4/2002 | Cooke et al. | 323/284 |
| 6,515,880 B1 | | 2/2003 | Evans et al. | |
| 6,922,044 B2 | * | 7/2005 | Walters et al. | 323/288 |
| 7,459,893 B2 | * | 12/2008 | Jacobs | 323/282 |
| 2004/0070382 A1 | * | 4/2004 | Walters et al. | 323/284 |
| 2004/0123167 A1 | | 6/2004 | Chapuis | |

* cited by examiner

*Primary Examiner*—Bao Q Vu
(74) *Attorney, Agent, or Firm*—Gary R. Stanford

(57) ABSTRACT

A steady state frequency control circuit for a variable frequency regulator including an open loop frequency control circuit, a frequency detector and a comparator circuit. The variable frequency regulator provides a clock signal indicating actual operating frequency and has a frequency control parameter for adjusting steady state operating frequency. The frequency detector receives the clock signal and provides a frequency sense signal which is compared with a steady state frequency reference signal to provide a frequency adjust signal. The frequency control parameter is adjusted by the frequency adjust signal to control steady state frequency. A method of controlling steady state frequency of a variable frequency regulator includes using open loop frequency control, determining the operating frequency and providing a frequency sense signal, comparing the frequency sense signal with frequency reference signal and providing a frequency adjust signal, and adjusting the frequency control parameter based on the frequency adjust signal.

20 Claims, 5 Drawing Sheets

STEADY STATE FREQUENCY CONTROL OF VARIABLE FREQUENCY SWITCHING REGULATORS

BACKGROUND OF THE INVENTION

1. Field of the Invention

The present invention relates to power electronics and variable frequency switching regulators, and more particularly to open and closed loop steady state frequency control of variable frequency switching regulators.

2. Description of the Related Art

Variable frequency switching architectures, such as, for example, synthetic ripple regulators, hysteretic regulators, constant on/off switching regulators, etc., are popular solutions for buck-type switching regulators used in various electronic devices, such as notebook computers and the like. Such topologies have the ability to respond quickly to transient events (e.g., significant load changes) without having to wait for a clock pulse or the like. Generally, such regulators operate in continuous conduction mode (CCM) at moderate to heavy loads and discontinuous conduction mode (DCM) at light loads. System designers prefer fixed frequencies in CCM so that filter components may be optimized and electromagnetic interference (EMI) minimized. The steady state operating frequency of such variable frequency switching topologies, however, varies widely with operating conditions, such as the output voltage, the input voltage, load conditions, etc. Many variable frequency switching regulators exhibit poor CCM steady state frequency control despite attempts to control the steady state frequency with open loop circuits. It has been a challenge, therefore, to accurately control the steady-state frequency of variable frequency switching regulators.

Various factors tend to affect the operating frequency of conventional regulators, such as inaccurate input voltage or output voltage sensing, changes of the loop compensation, changes of the output filter, comparator and driver propagation delays, inaccurate time constant matching, load changes (particularly for constant on-time switching devices), etc. Input voltage sensing is especially poor on devices that sample and hold the voltage of the phase pin to indirectly sense the input voltage. In many configurations, therefore, an addition pin is provided on the controller for receiving the input voltage to avoid sensing inaccuracies. An error amplifier with high bandwidth causes excessive ripple on the compensation signal, which causes the switching frequency to change with changes of the loop compensation or output filter. The switching frequency of constant on-time switching regulators tends to change with changes of the load. Although various regulator controllers employ extensive open loop circuitry in an attempt to stabilize the steady state switching frequency, the switching frequency control has still been poor. Some ripple control topology schemes have been able to improve the CCM frequency but at the expense of reduced transient response.

It is desired to improve the frequency control of many different types of variable frequency switching regulators without sacrificing transient performance.

SUMMARY OF THE PRESENT INVENTION

A steady state control circuit for controlling the steady state frequency of a variable frequency regulator including an open loop frequency control circuit, a frequency detector and a comparator circuit. The variable frequency regulator provides a clock signal indicative of operating frequency and has a frequency control parameter for adjusting steady state operating frequency of the variable frequency regulator. The open loop frequency control circuit controls the frequency control parameter in an attempt to control steady state frequency of operation. The frequency detector has an input for receiving the clock signal and an output providing a frequency sense signal indicative of operating frequency of the variable frequency regulator. The comparator circuit compares the frequency sense signal with a steady state frequency reference signal and provides a frequency adjust signal indicative thereof. The frequency control parameter is adjusted by the frequency adjust signal to control steady state frequency of the variable frequency regulator.

In one embodiment, the frequency detector includes a sawtooth generator and a filter. The sawtooth generator has an input for receiving the clock signal and an output providing a sawtooth waveform indicative of operating frequency of the variable frequency regulator. The sawtooth waveform is filtered to provide the frequency sense signal indicative of frequency of the sawtooth waveform. The filter may be implemented as a resistor-capacitor circuit or the like for filtering the sawtooth waveform to provide the frequency sense signal with a magnitude indicative of frequency of the sawtooth waveform.

The comparator circuit may be a transconductance amplifier having a first input receiving a frequency sense voltage, a second input receiving a frequency reference voltage, and an output providing the frequency adjust signal. A combiner may be included for combining the frequency adjust signal with the frequency control parameter to provide an adjust signal which is used to adjust the frequency control parameter.

A variable frequency regulator according to one embodiment includes an output inductor having first and second terminals, a power switching circuit, a variable frequency controller, an open loop frequency control circuit, and a closed loop frequency control circuit. The power switching circuit selectively applies an input voltage to the first terminal of the output inductor to develop an output voltage at the second terminal of the output inductor based on a clock signal. The variable frequency controller has an input receiving the output voltage and an output providing the clock signal for controlling the power switching circuit to regulate the output voltage. The open loop frequency control circuit controls a frequency control parameter in an attempt to control steady state frequency of operation. The closed loop frequency control circuit adjusts the frequency control parameter according to a target steady state frequency of operation.

The closed loop frequency control circuit may include a frequency detector and a comparator circuit. The frequency detector has an input for receiving the clock signal and having an output providing a frequency sense voltage indicative of operating frequency of the variable frequency controller. The comparator circuit compares the frequency sense voltage with a frequency reference voltage and provides a frequency adjust signal indicative thereof. The frequency detector may include a sawtooth generator and a filter. The filter may be a resistor-capacitor filter having a single low frequency pole. The comparator circuit may be a transconductance amplifier having a first input receiving the frequency sense voltage, a second input receiving the frequency reference voltage, and an output providing the frequency adjust signal.

In one embodiment, the open loop frequency control circuit is a window circuit which provides a window current to a window resistor to control a window voltage in an attempt to control the steady state frequency of operation. The variable frequency regulator may include a multiplier which multiplies the frequency adjust signal by the window current for providing an adjust current, and a current summing node which adds the adjust current to the window current to provide an adjusted window current to the window resistor.

The power switching circuit may include a phase node coupled between electronic switches which are coupled between the input voltage and ground. The variable frequency controller may include a synthetic ripple regulator controller and a sample circuit. The synthetic ripple regulator develops a ripple voltage indicative of ripple current through the output inductor based on the input voltage and the output voltage. The sample circuit samples voltage of the phase node for providing an input voltage sense signal provided to the synthetic ripple regulator controller.

A method of controlling the steady state frequency of a variable frequency regulator having a frequency control parameter for adjusting steady state operating frequency according to one embodiment includes controlling the frequency control parameter using open loop control in an attempt to steady state frequency, determining the operating frequency of the variable frequency regulator and providing a frequency sense signal indicative thereof, comparing the frequency sense signal with frequency reference signal and providing a frequency adjust signal indicative thereof, and adjusting the frequency control parameter based on the frequency adjust signal to control steady state frequency.

The variable frequency regulator may included a clock signal indicating operating frequency. The method may include generating a sawtooth waveform based on the clock signal, and filtering the sawtooth waveform to provide a frequency sense voltage having a magnitude indicative of the operating frequency. The method may include converting a difference between a frequency sense voltage and a frequency reference voltage to a frequency adjust current.

The frequency control parameter may be a window current, where the method may include multiplying the window current by the frequency adjust current to provide an adjust current, and adding the adjust current to the window current to provide an adjusted window current.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
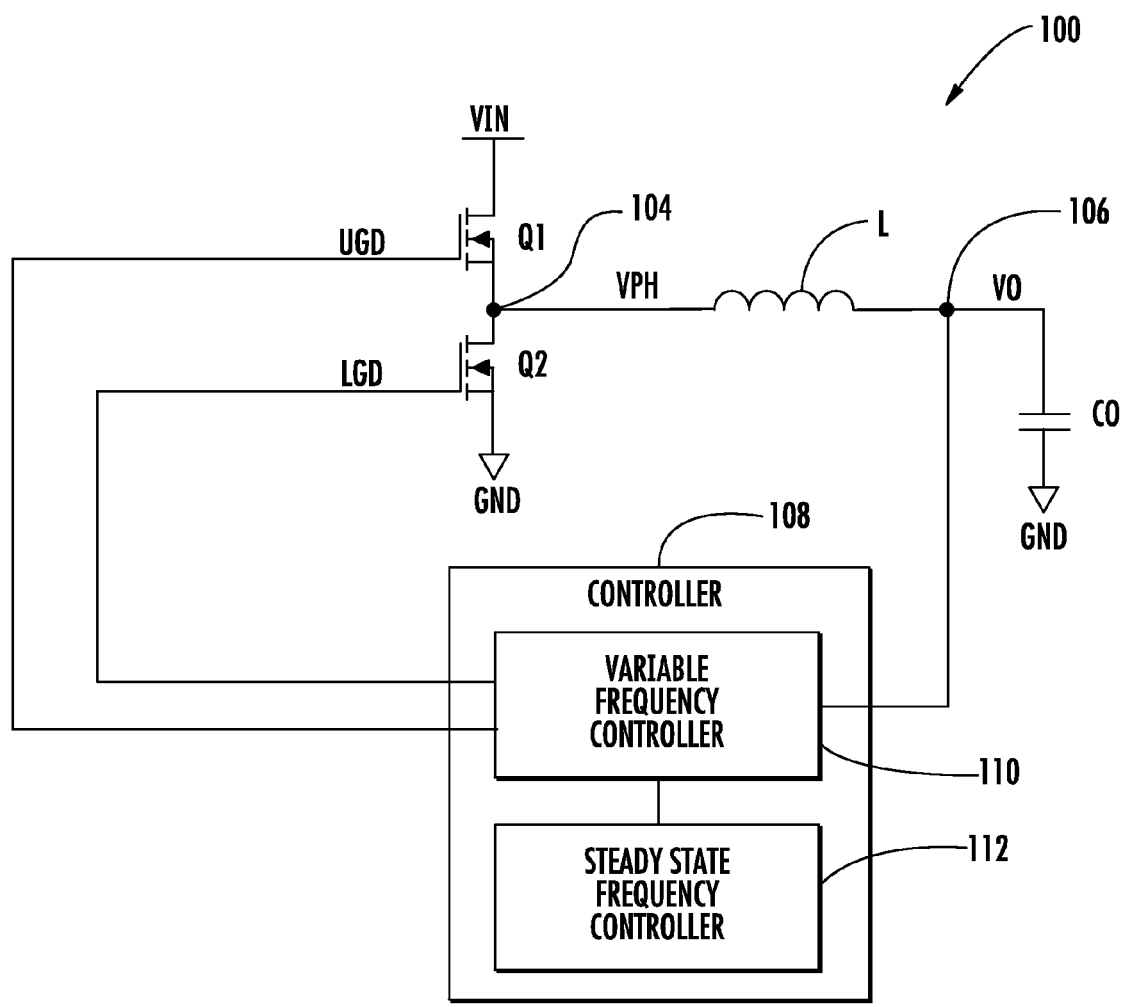
FIG. 1 is a simplified schematic and block diagram of a buck-type variable frequency regulator including a steady state frequency controller implemented according to one embodiment.

FIG. 1 is a simplified schematic and block diagram of a buck-type variable frequency regulator 100 including a steady state frequency controller 112 implemented according to one embodiment. A controller 108 provides an upper gate drive signal UGD to a gate terminal of upper switch Q1 and provides a lower gate drive signal LGD to a gate terminal of lower switch Q2. In the illustrated embodiment, the electronic switches Q1 and Q2 are shown as a pair of N-channel metal-oxide semiconductor, field-effect transistors (MOSFETs) as known to those skilled in the art. Other types of electronic switching devices may be used including P-channel MOSFETs or other types of FETs and the like. The switch Q1 has drain and source terminals coupled between VIN and a phase node 104 and the switch Q2 has drain and source terminals coupled between phase node 104 and ground (GND). It is noted that different ground signals may be employed, such as signal ground versus power ground, but each are referred to as ground or "GND" for simplicity of discussion. The switches Q1 and Q2 are controlled to switch input voltage VIN through a phase node 104 to one end of an output inductor L, having its other end coupled to an output node 106 which develops an output voltage VO. The phase node 104 develops a phase voltage shown as VPH, and the output voltage VO is filtered by an output capacitor CO coupled between the output node 106 and GND. In the illustrated configuration, the output voltage VO is fed back to the input of a variable frequency controller 110 of the controller 108, where the variable frequency controller 110 has an output developing the UGD and LGD signals.

During switching operation, the UGD signal is asserted high to turn on the upper switch Q1 which couples VIN to the output inductor L via the phase node 104. Eventually the UGD signal is negated low and the LGD signal is asserted high to turn on the lower switch Q2 effectively coupling the output inductor L to GND. Thus, the phase voltage VPH is generally switched between VIN and GND during switching operation, although current through the output inductor L causes the voltage to vary during certain portions of each cycle as understood by those skilled in the art. Although only the VO signal is shown provided to the controller 108, it is understood that other signals may also be provided to the controller 108 depending upon the particular configuration and control method. For example, any one or more of the phase voltage VPH, the input voltage VIN, a load indication (e.g., load current), etc., may also be provided to the controller 108.

As previously described, variable frequency switching architectures, such as, for example, synthetic ripple regulators, hysteretic regulators, constant on/off switching regulators, etc., are popular solutions for buck-type switching regulators used in electronic devices. The variable frequency regulator 100 is implemented according to a variable frequency switching architecture using the variable frequency controller 110. Variable frequency topologies, including the variable frequency regulator 100, have the ability to respond quickly to transient events including load variations without waiting for a clock pulse or the like. The steady state or direct current (DC) operating frequency of conventional variable frequency switching topologies, however, varies widely with operating conditions, such as, for example, the output voltage VO, the input voltage VIN, load conditions, etc. Many conventional variable frequency switching regulators exhibit poor continuous conduction mode (CCM) steady state frequency control. The steady state frequency controller 112 is shown coupled to the variable frequency controller 110 as part of the controller 108 for improving the steady state frequency control of the variable frequency regulator 100 without sacrificing its transient performance.

Figure 2:
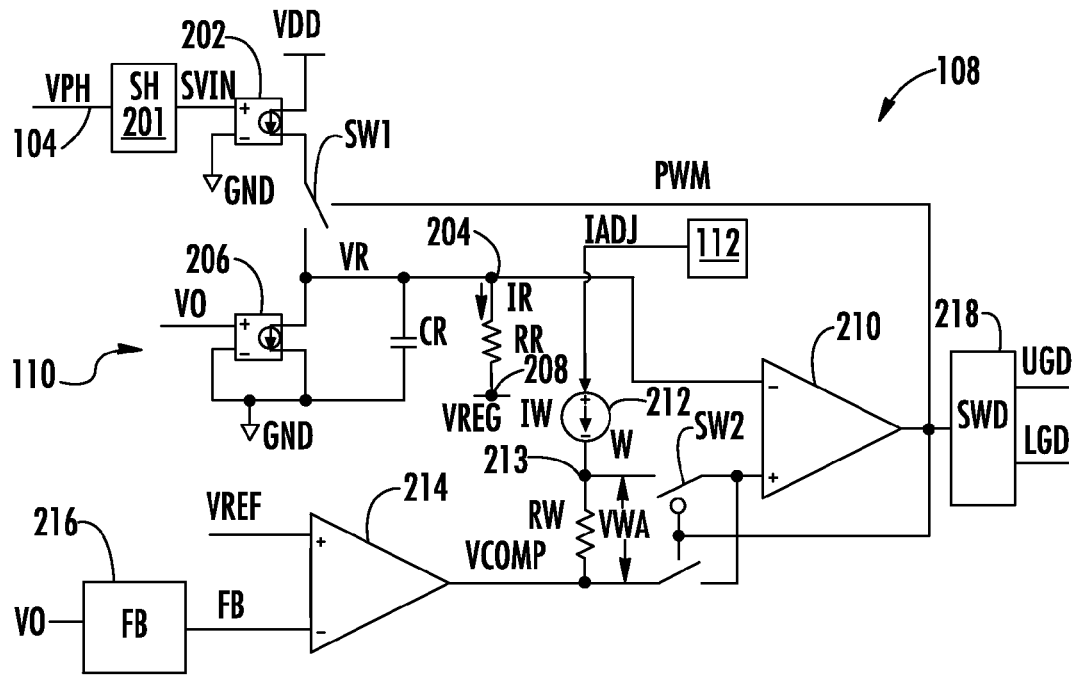
FIG. 2 is a simplified schematic and block diagram of the controller of FIG. 1 according to an exemplary embodiment.

FIG. 2 is a simplified schematic and block diagram of the controller 108 according to an exemplary embodiment. The controller 108 includes the variable frequency controller 110 which is implemented as a synthetic ripple regulator. The synthetic ripple regulator synthesizes or simulates the ripple current through the output inductor L for regulating the output voltage VO, including regulation during load transients. A sample and hold (SH) circuit 201 has an input coupled to the phase node 104 for receiving the VPH voltage and an output providing a sample voltage SVIN representing the input voltage VIN. The SH circuit 201 samples VPH while switch Q1 is on, such as based on a suitable switch indication value (e.g., PWM, UGD, LGD, etc.), and holds VPH during each cycle to represent the voltage of VIN. The sample voltage SVIN is provided to the positive voltage input of a transconductance amplifier 202, having a negative voltage input coupled to GND. The transconductance amplifier 202 has a pair of outputs coupled between a supply voltage VDD and a first switched terminal or pole of a single-pole, single-throw (SPST) switch SW1. VDD is used in various places throughout the circuitry as a source or supply voltage relative to GND. The other switched terminal of the switch SW1 is coupled to a "ripple" node 204 and the switch SW1 includes a control input receiving a pulse width modulation (PWM) signal. When the switch SW1 is closed, the transconductance amplifier 202 provides a current to node 204 which is proportional to the input voltage SVIN (based on VIN). The switch SW1 is closed when the PWM signal is asserted to a first level (e.g., when the upper switch Q1 is on) and otherwise opened.

The output voltage VO is provided to the positive voltage input of another transconductance amplifier 206 having its negative voltage input coupled to GND. For simplicity of discussion, the transconductance "gm" of both amplifiers 202 and 206 are about the same. The current output terminals of the transconductance amplifier 206 are coupled between node 204 and GND. A ripple capacitor CR is coupled between node 204 and GND and a ripple resistor RR is coupled between node 204 and a node 208 providing a "regulated" voltage level VREG. VREG may be GND or a small constant voltage, such as 1 Volt (V). A ripple current IR is shown flowing into the ripple resistor RR from node 204. The transconductance amplifier 206 constantly draws a current based on the output voltage VO from node 204 to continuously discharge the capacitor CR. The node 204 develops a ripple voltage VR and is coupled to the inverting (−) input of a comparator 210. The non-inverting (+) input of the comparator 210 is selectively coupled to receive either a compensation voltage VCOMP developed on a node 215 or a window voltage W developed on a window node 213. An internal reference voltage VREF is provided to the non-inverting (+) input of the EA 214. The output voltage VO is provide to the input of a feedback (FB) circuit 216, having its output providing a feedback signal FB to the inverting (−) input of the EA 214. As understood by those skilled in the art, the feedback circuit 216 senses (e.g., using a sense circuit such as a voltage divider or the like) and otherwise provides compensation of the output voltage VO and develops the FB signal. The EA 214 amplifies the difference between VREF and FB to develop VCOMP reflecting an error of the output voltage VO.

A window current generator 212 has an output coupled to the window node 213 for providing a window current IW to one end of a window resistor RW, which has its other end coupled to node 215. The window current generator 212 develops the window current IW to adjust the window voltage W relative to VCOMP in an attempt to maintain a relatively constant switching frequency of the variable frequency regulator 100. As previously noted, however, this open loop configuration does not achieve desired steady state frequency of operation. The steady state frequency controller 112 is coupled to the window current generator 212 and develops a window voltage adjust current IADJ, which is added to the window current IW to develop an adjusted window voltage WVA across the window resistor RW, as further described below. The window node 213 develops a window voltage W, which is the adjusted window voltage WVA added to VCOMP, or W=VWA+VCOMP. The selection between nodes 213 and 215 is based on the state of a switch SW2 configured to operate similar to a single-pole, double throw (SPDT) switch as controlled by the PWM signal. The output of the comparator 210 provides the PWM signal used to control the switches SW1 and SW2, and which is provided to the input of a switch driver (SWD) 218. The switch driver 218 has respective outputs providing the UGD and LGD signals provided to the power electronic switches Q1 and Q2 as previously described.

In operation, the transconductance amplifier 206 constantly draws current based on the output voltage VO from node 204 to continuously discharge the ripple capacitor CR. When the switch SW1 is closed upon assertion of the PWM signal, a current based on the input voltage VIN is provided through the switch SW1 by the transconductance amplifier 202 to charge the capacitor CR. Although the SVIN voltage is used, it represents VIN so that the charge current is said to be based on VIN. Since VIN is greater than VO, when the switch SW1 is closed and the capacitor CR is charged by a collective current based on a difference between the voltages VIN and VO, or VIN−VO. When the switch SW1 is opened by PWM, the capacitor CR is discharged based on VO. As understood by those skilled in the art, the voltage VO is continually applied to one end of the output inductor L. The other end of the output inductor L is switched between the input voltage VIN and GND, causing a ripple current to flow through the output inductor L based on VIN and VO. In this manner, the voltage VR on ripple node 204 is a ripple voltage representing the ripple current through output inductor L. The EA 214 develops the VCOMP signal as a compensation voltage indicative of the relative error of the output voltage VO. In particular, VO is compared to the reference voltage VREF which represents the target voltage level of VO. When PWM is asserted to its first level, the voltage of VR rises at a constant rate (based on charge voltage VIN−VO) and the switch SW2 selects the window node 213 providing the window voltage W=VCOMP+VWA. When the voltage of VR rises above the voltage of VWA+VCOMP, the comparator 210 switches PWM to the second level causing the switch SW2 to switch to selecting VCOMP on node 215 and causes the switch SW1 to open so that VR decreases at a constant rate based on VO. In this manner, the comparator 210 operates as a hysteretic comparator which compares the synthetic ripple voltage VR within a window voltage between VCOMP and W.

Figure 3:
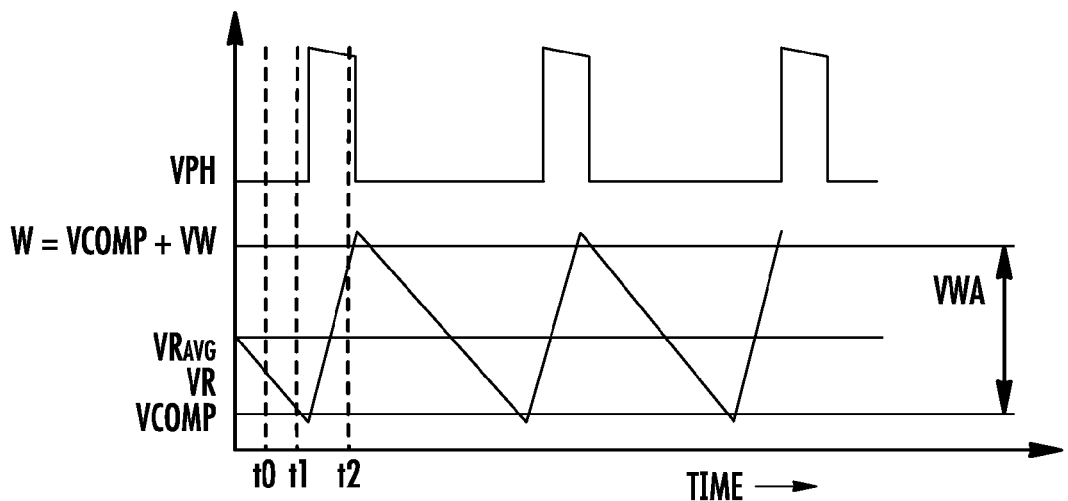
FIG. 3 is a graphic timing diagram illustrating the typical switching waveforms of the variable frequency regulator of FIG. 1 using the variable frequency controller of FIG. 2.

FIG. 3 is a graphic timing diagram illustrating the typical switching waveforms of the variable frequency regulator 100 using the variable frequency controller 200 as the controller 110. The VPH, VCOMP, W=VCOMP+VWA, and VR voltages are plotted versus time. Also plotted is an average of VR, shown as $VR_{AVG}$. The VR, VCOMP, W and $VR_{AVG}$ voltages are plotted on top of each other to illustrate their respective levels during switching operation. At an initial time t0 the PWM signal is negated low so that SW1 is opened, SW2 selects VCOMP, and Q1 is off. Thus, VR is initially decreasing since the capacitor CR is being discharged by amplifier 206. At subsequent time t1, VR decreases to the level of VCOMP causing the comparator 210 to switch states to assert PWM to its first state closing SW1, causing SW2 to switch to node 213 with voltage level W=VCOMP+VWA. Since SW1 is closed, the capacitor CR is charged by the amplifier 202 causing the VR voltage to increase. Also, the PWM signal causes the switch driver 218 to assert the UGD signal turning on switch Q1, so that the phase node 104 is effectively coupled to VIN. Thus, VPH jumps up to a high level just after time t1. At subsequent time t2, VR rises to W=VCOMP+VW causing the comparator 210 to switch back to negate PWM low. When PWM is negated low, switch SW1 is opened and SW2 switches back to selecting VCOMP. The negated PWM signal also causes the switch driver 218 to negate the UGD signal and to then assert the LGD signal to turn on the switch Q2, so that the phase voltage VPH goes back to its low state just after time t2. Also, VR starts ramping down again towards VCOMP as previously described. Operation repeats in this manner for subsequent cycles of the PWM signal.

Although VCOMP is shown relatively stable, VCOMP varies with load conditions as understood by those skilled in the art. In fact, both VCOMP and switching frequency change with varying load conditions to maintain the output voltage VO within predetermined tolerance levels. Also, the window current generator 212 attempts to adjust IW to maintain constant current in the steady state condition. In one embodiment, IW is varied with VIN, VO and load in an open loop manner in an attempt to hold the CCM steady state frequency constant. Ignoring the correction provided by IADJ, the period Ts of VR is calculated according to the following equation (1):

$$Ts = \frac{CR \cdot W}{gm \cdot (VIN - VO) - IR_{AVG}} + \frac{CR \cdot W}{gm \cdot VO + IR_{AVG}} \quad (1)$$

in which "CR" is the capacitance of the capacitor CR, "W" is the window voltage, "gm" is the transconductance of both transconductance amplifiers 202 and 206, and $IR_{AVG}$ is the average of the current IR through the ripple resistor RR. The frequency Fs is solved according to Fs=1/Ts using equation (1) as illustrated by the following equation (2):

$$Fs = \frac{(gm \cdot VO + IR_{AVG})\left(1 - \frac{VO}{VIN} - \frac{IR_{AVG}}{gm \cdot VIN}\right)}{CR \cdot W} \quad (2)$$

For most applications, the term $IR_{AVG}/gm \cdot VIN$ may be ignored so that the frequency Fs may be simplified as shown by the following equation (3):

$$Fs = \frac{(gm \cdot VO + IR_{AVG})\left(\frac{VIN - VO}{VIN}\right)}{CR \cdot W} \quad (3)$$

In order to achieve open loop constant frequency using the variable frequency controller 200, W is set according to the following equation (4):

$$W = (gm \cdot VO + IR_{AVG})\left(\frac{VIN - VO}{VIN}\right) \cdot RW \quad (4)$$

where "RW" is the resistance of the window resistor RW. Equation (4) is substituted into equation (3) to solve for Fs as shown by the following equation (5):

$$Fs = \frac{1}{CR \cdot RW} \quad (5)$$

Ideally, according to equation (5), the frequency Fs only varies with the capacitance of the ripple capacitor CR and the resistance of the window resistor RW, again ignoring the effect of IADJ. If such were the case, then the steady state frequency response would be relatively stable. Actual laboratory results using a conventional variable frequency controller configured in a similar manner, however, show significant frequency variations when the input voltage VIN is swept between expected voltage levels at different voltage levels of VO. Changing the application setup also causes undesired frequency variations. The frequency variations occur because the steady state configuration of the window current generator 212 neglects the second order effects of driver delays, output filter size, feedback ripple and tuning components. Such variables and parameters are difficult to measure and to provide the desired level of compensation to maintain a relatively constant frequency. It has been observed that in a ripple control buck regulator, comparator and driver delays can cause the CCM frequency to vary by a significant amount. One approach is to intentionally vary the delay until the switching frequency and phase matches an external clock. Normally in standard designs, the delay would be minimized to ensure fast transient response. To stabilize steady state frequency according to this conventional approach, however, the delay was increased significantly so that it could be adjusted in either direction to regulate frequency. When a topology according to this approach responds to a step transient, it must wait for the additional delay to respond to transient events. Such operation is similar to clocked topologies which need to wait for the clock to respond to a transient event. The fast transient response of the ripple control topology, therefore, was sacrificed to obtain constant CCM frequency in the conventional approach.

Figure 4:
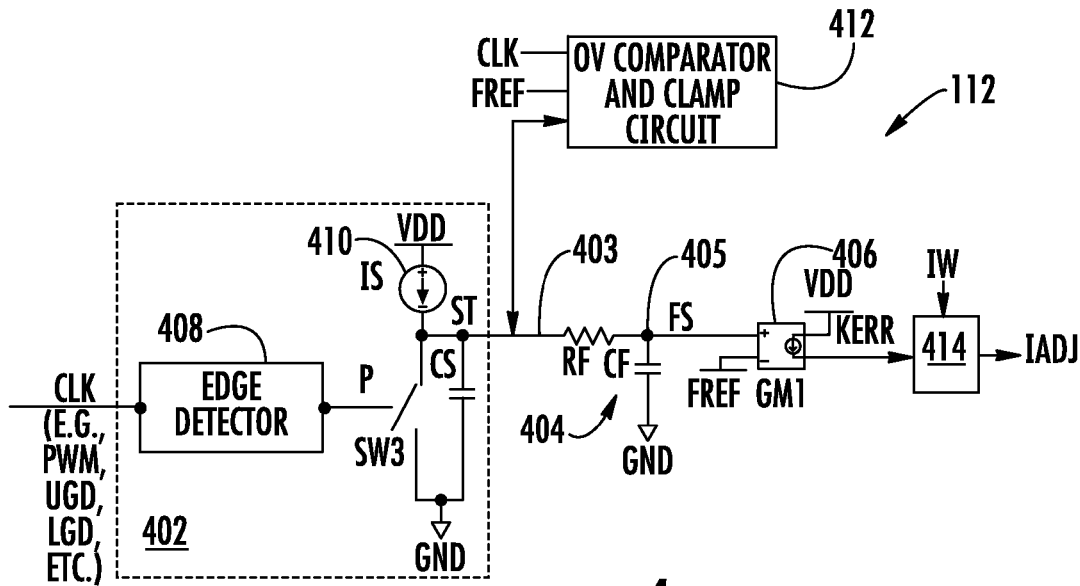
FIG. 4 is a schematic and block diagram of the steady state frequency controller of FIG. 1 implemented according to one embodiment used to control the steady state switching frequency of the variable frequency regulator of FIG. 1.

FIG. 4 is a schematic and block diagram of the steady state frequency controller 112 implemented according to one embodiment used to control the steady state switching frequency of the variable frequency regulator 100. The steady state frequency controller 112 includes a sawtooth generator 402, a filter 404, a transconductance amplifier 406, and a combiner 414. The sawtooth generator 402 develops a sawtooth waveform (ST) signal on a node 403, which is filtered by the filter 404 to provide a frequency sense (FS) signal on a node 405. The FS signal has a magnitude which is adjusted based on the frequency of the ST signal. The transconductance amplifier 406 regulates the FS signal to a frequency reference voltage FREF by adjusting the switching frequency of the variable frequency regulator 100 by adjusting the period of the sawtooth signal ST. The filter 404 is shown as a resistor-capacitor (RC) filter including a resistor RF coupled between nodes 403 and 405 and a capacitor CF coupled between node 405 and GND providing a low frequency pole for filtering the ST signal. The transconductance amplifier 404 has a transconductance value of "gm1" having a non-inverting input coupled to node 405 receiving the FS signal, an inverting input receiving the FREF voltage, and an output developing a closed loop adjustment value KERR. The adjustment value KERR is shown as an adjust current which is used to adjust and stabilize the frequency of the variable frequency regulator 100. The adjustment value KERR may have alternative forms in alternative configurations, such as an adjustment voltage or the like. KERR and the window current IW are provided to respective inputs of the combiner 414, which outputs the window adjustment current IADJ.

In the illustrated embodiment, the sawtooth generator 402 includes an edge detector 408, a normally-open SPST switch SW3, a current source 410 providing a constant current IS to node 403, and a capacitor CS coupled between node 403 and GND. The edge detector 408 has an input receiving a clock (CLK) signal and an output coupled to a control input of the switch SW3. The CLK signal is any of several periodic signals within the controller 108 indicative of the operating frequency of the variable frequency regulator 100, such as any of the signals or voltages PWM, UGD, LGD, etc. The edge detector 408 develops pulses on a pulse signal P at its output which in response to active or operative edges of CLK. The switch SW3 has switched terminals coupled between node 403 and GND and a control input receiving the P signal. The current source 410 is coupled between VDD and node 403 and charges the capacitor CS with the IS current while the SW3 is opened. The voltage of the capacitor CS is cleared or otherwise reset back to zero or GND when the switch SW3 is closed. The ST signal is developed on node 403 as the voltage of the capacitor CS. An overvoltage (OV) comparator and clamp circuit 412 is show having respective inputs receiving the CLK and FREF signals and an input/output (I/O) coupled to node 403 for controlling the ST signal.

In operation, the edge detector 408 asserts a pulse on the P signal to momentarily close the normally-open switch SW3 with each operative edge of the CLK signal. The operative edge may be a rising edge or a falling edge depending upon the particular periodic signal employed as the CLK signal. In an alternative embodiment, a level detector may be used instead to detect an operative logic level of CLK. Each pulse on P momentarily closes SW3 to reset the sawtooth ST signal to zero or GND, and then re-opens the switch SW3 to initiate the next charge cycle. The voltage of the capacitor CS and thus the sawtooth signal ST ramps up at a constant rate while the switch SW3 is opened thus developing the characteristic sawtooth waveform on the ST signal. The filter 404 filters the ST signal to provide the frequency sense signal FS, which has a magnitude that is adjusted based on the frequency of the ST signal. The voltage difference between the FS and FREF signals is amplified by the amplifier 406 based on transconductance gm1 and converted to the adjustment value KERR, which is used to adjust the frequency of the variable frequency regulator 100. In general, the sawtooth signal ST ramps up to about twice the voltage of FREF, or 2*FREF, and is reset back to GND during normal operation. The maximum magnitude of ST increases with slower switching frequency of CLK and decreases with faster switching frequency of CLK. The magnitude of the FS signal is responsive to the maximum magnitude of ST and thus reflects the switching frequency of CLK, which ultimately reflects the switching or operating frequency of the variable frequency regulator 100. The FREF voltage is set at a level indicative of a target switching frequency of the variable frequency regulator 100. In one embodiment, for example, the target steady state frequency is approximately 300 kilohertz (kHz). The transconductance amplifier 406 asserts adjustment value KERR at a level which reflects the relative error of the actual switching frequency compared to the desired steady state frequency of the regulator 100. As FS rises above FREF indicating lower than desired frequency, the adjustment value KERR is asserted to increase frequency. Similarly, as FS falls below FREF indicating higher than desired frequency, the adjustment value KERR is asserted to reduce frequency. If for any reason the CLK signal does not go high for a significant period of time such that ST rises to a predetermined overvoltage level OV, then the OV comparator and clamp circuit 412 temporarily clamps the ST signal to the voltage level of FREF. If and when the CLK signal goes high again, the OV comparator and clamp circuit 412 releases node 403 to resume normal operation.

In alternative embodiments, any recurring periodic signal, such as any of the PWM, UGD, LGD, etc., signals, may be used as the CLK signal controlling the switch SW3. In general, the sawtooth generator 402 and the filter 404 collectively operate as a frequency detector indicative of the frequency of the CLK signal. The CLK signal, in turn, reflects the actual operating frequency of the variable frequency regulator 100. For example, the PWM signal being asserted to an active logic state (e.g., logic "high") causes the switch driver 218 to assert UGD high to turn on the switch Q1 for each cycle, this reflecting the actual operating frequency of the variable frequency regulator 100. The UGD signal may be used in similar manner. Any suitable amplifier may be used instead of the transconductance amplifier 406. As noted above, for example, the adjustment value KERR may be a voltage control signal such that a voltage amplifier is used instead. The implementation of the combiner 414 depends upon the signal types of the input KERR and IW signals. In one embodiment, the KERR and IW signals are both current signals in which case the combiner 414 multiplies the magnitude of IW by the magnitude of KERR to develop the window adjust current IADJ.

Figure 5:
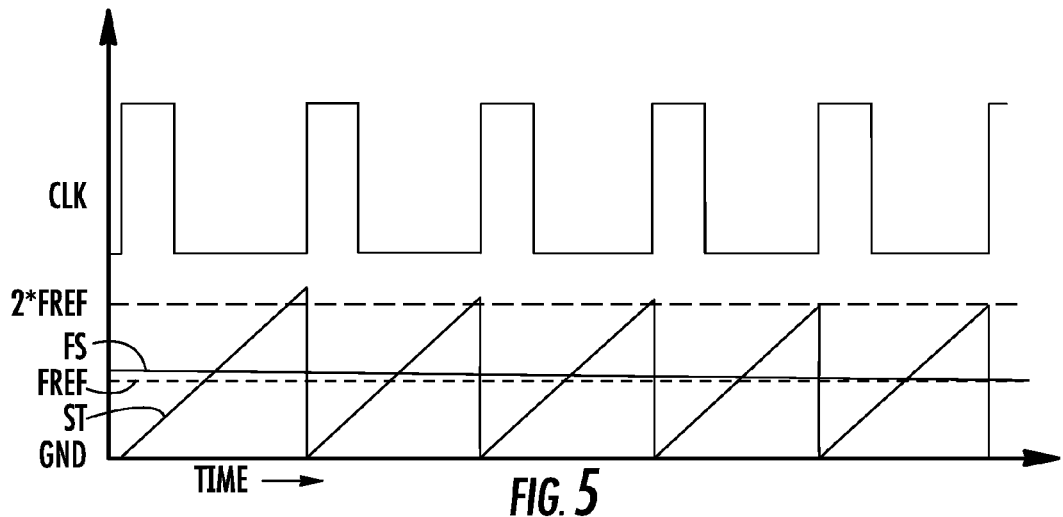
FIG. 5 is a timing diagram plotting selected voltages versus time in the transient domain illustrating operation of the steady state frequency controller of FIG. 4 for regulating to a higher frequency level.

FIG. 5 is a timing diagram plotting CLK, ST, 2*FREF, FREF, and FS versus time in the transient domain illustrating operation of the steady state frequency controller 112 for regulating to a higher frequency level. The CLK signal is shown at top and the ST, 2*FREF, FREF and FS signals are shown plotted together for ease of comparison with each other. The FREF signal and twice the FREF signal, or 2*FREF, are shown using dashed lines. The steady state frequency controller 112 attempts to regulate the ST signal between zero or GND and 2*FREF to keep the voltage of FS approximately equal to the voltage level of FREF. As shown, a decrease of the operating frequency of CLK causes the peak of the ST signal to rise above 2*FREF which causes an increase of the magnitude of the FS signal above FREF. The steady state frequency controller 112 develops the adjustment value KERR which is used in the feedback loop to bring FS back to the level of FREF and to regulate the ST signal between GND and 2*FREF after a few cycles as shown.

Figure 6:
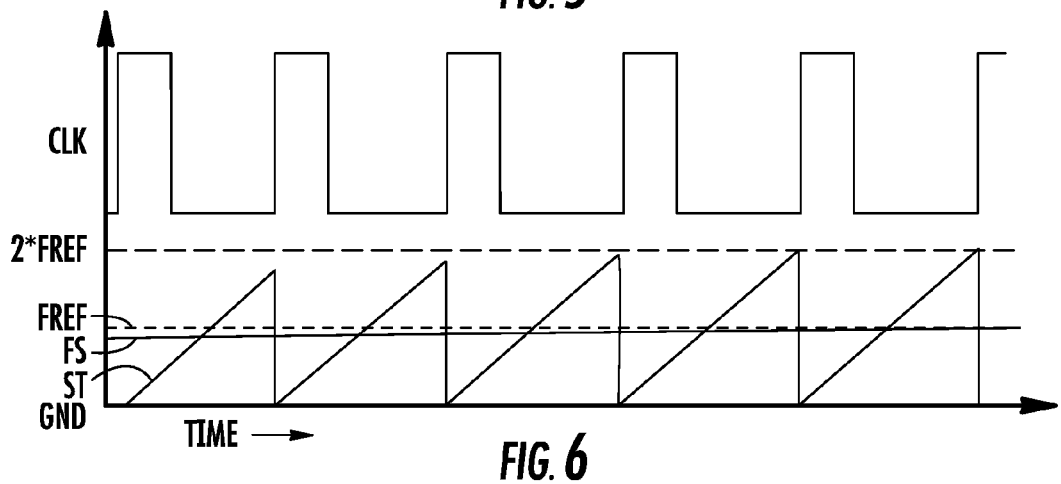
FIG. 6 is a graph diagram plotting selected voltages versus time in the transient domain illustrating operation of the steady state frequency controller of FIG. 4 for regulating to a lower frequency level.

FIG. 6 is a graph diagram plotting the CLK, ST, 2*FREF, FREF and FS signals versus time, similar to FIG. 5, except for the case in the transient domain illustrating operation of the steady state frequency controller 112 for regulating to a lower frequency level. In this case, an increase of the operating frequency of CLK causes the peak of the ST signal to fall below 2*FREF which causes a decrease of the magnitude of the FS signal below FREF. The steady state frequency controller 112 develops the adjustment value KERR used in the feedback loop to bring FS back to the level of FREF and to regulate the ST signal between GND and 2*FREF after a few cycles as shown.

Figure 7:
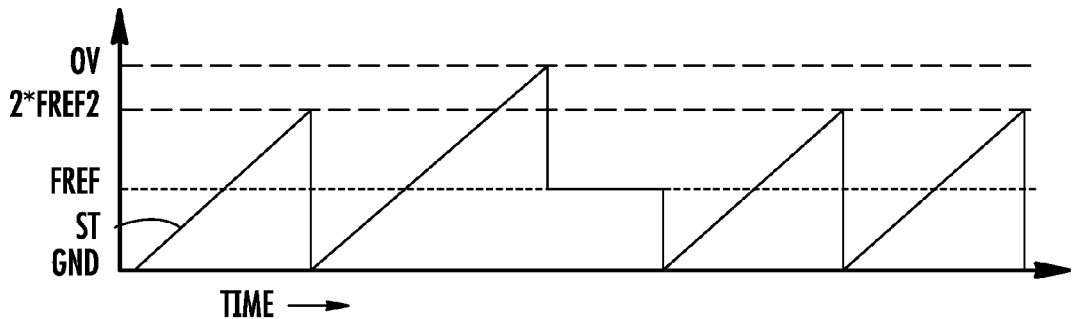
FIG. 7 is a graph diagram plotting selected signals together with the overvoltage level illustrating operation of the OV comparator and clamp circuit of FIG. 4.

FIG. 7 is a graph diagram plotting 2*FREF, FREF and ST together with the overvoltage level OV illustrating operation of the OV comparator and clamp circuit. In the event there is no assertion of CLK for a significant amount of time due to a transient event, such as a load transient release, the voltage of ST rises to the overvoltage threshold OV above 2*FREF, which triggers the overvoltage condition of the OV comparator and clamp circuit 412. When the ST signal rises to the overload threshold OV, then the OV comparator and clamp circuit 412 clamps ST to FREF until the next rising edge of CLK. In one embodiment OV is a factor of FREF, such as 2.4*FREF, suitable for detecting an overvoltage condition.

Figure 8:
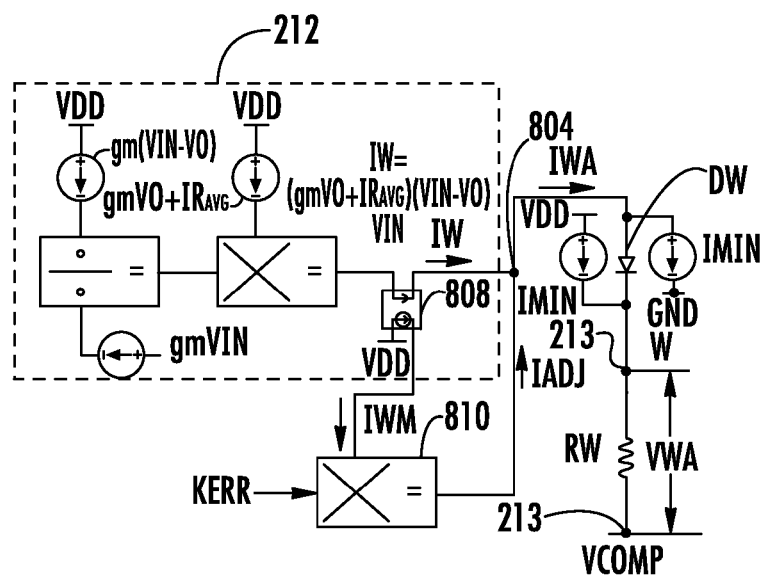
FIG. 8 is a schematic and block diagram of a window control circuit implemented within the controller of FIG. 1 for developing the window voltage according to an exemplary embodiment.

FIG. 8 is a schematic and block diagram of a window control circuit 800 implemented within the controller 108 for developing the window voltage W according to an exemplary embodiment. The window current generator 212 is shown as an open loop control block approximating an exemplary open loop configuration for developing the IW current. The window current generator 212 develops the window current IW provided to a current summing node 804 of a current clamp circuit 806 as shown. The window current IW provided to node 804 is in accordance with equations (4) and (5) previously described in an attempt to regulate the steady state frequency based on CR and RW. The current IW is asserted through the input terminals of a current mirror 808, which has output terminals providing a mirror current IWM to one input of a combiner 810. In one embodiment, IWM=IM in the mirrored configuration, although any scaling factor may be incorporated if desired. The other input of the combiner receives the adjustment value KERR, and the output of the combiner 810 is coupled to the current summing node 804 and provides the IADJ current. In this case the combiner 810 performs the same function as the combiner 414 previously described. The window adjustment current IADJ is added to the IW current to provide an adjusted window current IWA. The node 804 is coupled to the anode of a window diode DW, having its cathode coupled to the window node 213 developing the window voltage W. A current source 812 is coupled between source voltage VDD and node 213 sourcing a bias current IMIN to node 213. A current sink 814 is coupled between node 804 and GND for sinking the bias current IMIN from the node 804. Thus, the current devices 812 and 814 collectively develop the bias current IMIN through the diode DW. The window resistor RW is coupled between window node 213 W and node 215 developing VCOMP as previously described. The adjusted window current IWA flows through diode DW and resistor RW to develop the window voltage W, which is equal to VCOMP plus the adjusted window voltage VWA across the window resistor RW.

In operation, the adjustment value KERR is combined (e.g., magnitude multiplied) with IWM representing the approximated open loop window size and the resulting current IADJ is then added to IW at the summing node 804. In this manner, the gain of the frequency control loop holds constant regardless of the window size. In other words, the adjustment value KERR cancels the VIN, VO, gm, and $IR_{AVG}$ terms out of the DC frequency loop gain equation. The window voltage as modified by the adjusted window voltage VWA is derived from equation (4) by adding a term the adjustment value KERR as shown by the following equation (6):

$$W = (1 + KERR)(gm \cdot VO + IR_{AVG})\left(\frac{VIN - VO}{VIN}\right) \cdot RW \tag{6}$$

Working around the frequency loop, the steady state operating frequency is approximated by substituting equation (6) into equation (3) to determined the frequency Fs as shown by the following equation (7):

$$Fs = \frac{1}{(CR \cdot W)(1 + KERR)} \tag{7}$$

The adjustment value KERR may also be calculated from the steady state frequency according to the following equation (8):

$$KERR = gm1\left(FREF - \frac{0.5 \cdot IS}{Fs \cdot CS}\right) \tag{8}$$

The DC gain "Av" of the loop is according to the following equation (9):

$$Av = \frac{0.5 \cdot gm1 \cdot IS \cdot CR \cdot RW}{CS} \tag{9}$$

In one embodiment, the current IS developed within the steady state frequency controller 112 is a trimmed current level to obtain a desired level of accuracy of the steady state frequency. The closed loop implemented by the steady state frequency controller 112 is relatively slow as compared to operation of the variable frequency regulator 110, at least in part due to relatively slow response of the RC filter 404. In simulation results, the operation of the variable frequency controller 110 remains substantially the same with or without the steady state frequency controller 112. In this manner, the variable frequency regulator 100 including both the variable frequency controller 110 and the steady state frequency controller 112 has fast transient response so that transient performance is not compromised. In the steady state condition absent load transients and the like, the steady state frequency controller 112 resumes control and stabilizes the frequency of operation to the target frequency level. In this manner, the steady state frequency controller 112 enables removal of any requirement for a frequency steady state operating conditions. Furthermore, the steady state frequency response is less responsive to changes of VIN so that VIN need not be directly monitored. Instead, a less accurate sample and hold technique by the SH circuit 201 may be used to sample the VPH voltage on the phase node 104 thereby allowing removal of the VIN pin on the controller. Many controllers already have a phase pin input for directly receiving the phase voltage for control purposes, so that elimination of the VIN pin provides a significant advantage. The steady state frequency controller 112 thus eases customer setup.

It is noted that the configuration of the window current provided through the window resistor RW to develop the window voltage implements a frequency control parameter for controlling operating frequency of the variable frequency regulator 100. In the illustrated embodiment, the window current generator 212 providing the window current IW implements an open loop frequency control circuit which attempts to control operating frequency during steady state conditions. The window current generator 212 is open loop in that it does not measure actual operating frequency but measures other parameters, such as input voltage VIN, output voltage VO, load conditions, etc. The steady state frequency controller 112 implements a closed loop steady state frequency control circuit which adjusts the frequency control parameter to provide improved results. In the illustrated embodiment, the adjustment value KERR is combined with IW to develop IADJ, which is used to adjust the window current provided to the window resistor RW which adjusts the window voltage controlling steady state frequency. The steady state frequency controller 112 is closed loop in that the actual operating frequency is determined based on the selected clock signal and the frequency control parameter is adjusted accordingly.

Figure 9:
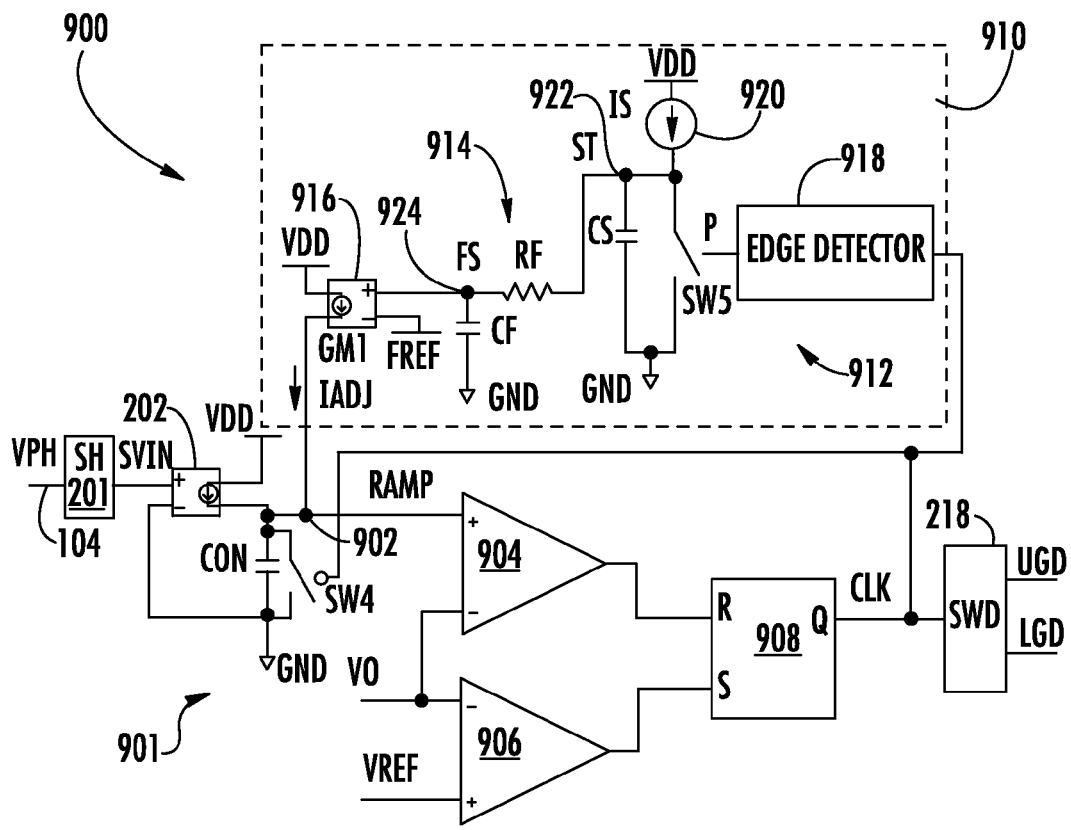
FIG. 9 is a simplified schematic and block diagram of another controller based on a constant on-time topology according to an exemplary embodiment which may be used as the controller of FIG. 1.

FIG. 9 is a simplified schematic and block diagram of another controller 900 based on a constant on-time topology according to an exemplary embodiment which may be used as the controller 108 of FIG. 1. The controller 900 includes variable frequency controller 901 and steady state frequency controller 910 and may be used as the controller 108 in an alternative embodiment. For the variable frequency controller 901, the phase voltage VPH on the phase node 104 is provided to the input of the SH circuit 201 providing the SVIN voltage as previously described. SVIN is provided to the transconductance amplifier 202 having its output coupled between VDD and a node 902. Thus, the transconductance amplifier 202 provides a charge current to the node 902 based on the input voltage VIN in a similar manner previously described. A capacitor CON and the two switched terminals of a SPST switch SW4 are coupled in parallel between node 901 and GND. Thus, the capacitor CON is charged by the transconductance amplifier 202 when switch SW4 is opened and is discharged when the switch SW4 is closed to develop a ramp voltage RAMP on the node 902. Node 902 is provided to the non-inverting input of a comparator 904 which receives the output voltage VO at its inverting input. VO is provided to the inverting input of another comparator 906, receiving VREF at its non-inverting input. The output of the comparator 904 is provided to the reset (R) input of a set-reset (SR) flip-flop 908 and the output of the comparator 906 is provided to the set (S) input of the SR flip-flop 908. The non-inverting or "Q" output of the SR flip-flop 908 develops a PWM signal provided to the input of the switch driver 218, to the input of a steady state frequency controller 910, and to the control input of the switch SW4.

In normal operation of the variable frequency controller 901, the switch SW4 is closed when PWM is low so that the node 902 remains low. When VO drops below VREF, the comparator 906 sets the SR flip-flop 908 which pulls PWM high initiating a power cycle. In particular, UGD goes high turning on the upper switch Q1 to pull VO back up to VREF. Also, PWM going high opens switch SW4 initiating an increasing ramp voltage of the RAMP signal. When RAMP reaches the voltage of VO, the comparator 904 resets the SR flip-flop 908 to pull PWM back low again. The variable frequency controller 901 operates with variable frequency in response to load transients and attempts to operate at a constant frequency during steady state conditions. The control loop is open loop based on VIN and VO and attempts to control steady state frequency. As previously noted, however, the steady state or DC operating frequency varies widely with operating conditions, such as, for example, the output voltage VO, the input voltage VIN, load conditions, etc. The variable frequency regulator 901 exhibits relatively poor CCM steady state frequency control.

The steady state frequency controller 910 is shown coupled to the variable frequency controller 901 as part of the controller 900 for improving the steady state frequency control of the variable frequency regulator 100 without sacrificing its transient performance. The steady state frequency controller 910 is configured in substantially similar manner as the steady state frequency controller 112 previously described and includes a sawtooth generator 912, a filter 914 and a transconductance amplifier 916. In the illustrated embodiment, the sawtooth generator 912 includes an edge detector 918, a normally-open SPST switch SW5, a current source 920 providing a constant current IS to node 922, and a capacitor CS coupled between node 922 and GND. The edge detector 918 has an input receiving the PWM signal and an output coupled to a control input of the switch SW5. The edge detector 918 develops pulses on a pulse signal P at its output which in response to active or operative edges of PWM (e.g., rising edges of PWM). The switch SW5 has switched terminals coupled between node 922 and GND and a control input receiving the P signal. The current source 920 is coupled between VDD and node 922 and charges the capacitor CS with the IS current while the SW5 is opened. The voltage of the capacitor CS is cleared or otherwise reset back to zero or GND when the switch SW5 is closed. The ST signal is developed on node 922 as the voltage of the capacitor CS. The filter 914 includes resistor RF coupled between node 922 and a node 924 and a capacitor coupled between node 924 and GND, where the node 924 develops the FS voltage as previously described. FS and FREF are provided to respective inputs of the transconductance amplifier 916, which in this case develops the IADJ directly at its output. IADJ is provide directly to node 902 operating as a summing node to adjust steady state frequency. An OV comparator and clamp circuit (not shown) similar to the OV comparator and clamp circuit 412 may be included if desired for controlling the ST signal.

In operation, the steady state frequency controller 910 adjusts the charging current provided to capacitor CON to adjust the RAMP voltage to control steady state frequency. The variable frequency regulator 901 responds quickly to load transients and the steady state frequency controller 910 responds more slowly to ultimately control the steady state frequency as desired without substantially modifying operation of the variable frequency regulator 901. It is noted that in this case the frequency control parameter is the charge current of the capacitor CON setting the frequency of operation. The steady state frequency controller 910 may further include a combiner similar to the combiner 414 or 810 for combining the output of the transconductor amplifier 916 with the charge current of the capacitor CON in a similar manner as previously described. It has been determined, however, that in certain cases the frequency adjust parameter output from the steady state frequency controller may be used directly while achieving desired steady state frequency control results.

In a more specific embodiment of the steady state frequency controller 112 or 910, component values are selected to set a particular closed loop gain of the steady state frequency controller 112. In one embodiment, the RF resistor is 600 kilohms (kΩ) and the CF capacitor is 200 picofarads (pF) to provide a loop gain of approximately 40 decibels (dB). In this embodiment the loop is stable with a single pole at 1.3 kHz and remaining poles and zeroes are well above the gain bandwidth of the loop of the steady state frequency controller 112 or 910.

As described herein, a regulator controller according to one embodiment uses both an open loop and a dedicated closed loop to control steady state CCM switching frequency. A controller according to one embodiment allows a variable frequency regulator to operate at an accurate fixed steady state frequency in CCM. A controller according to one embodiment helps to reduce the number of pins required on variable eliminated as the CCM frequency is set to a predetermined value (e.g., 300 kHz). A controller according to one embodiment also removes the need for a voltage input sense pin on the controller itself. The input voltage does not affect CCM switching frequency, so input voltage or detection thereof may be less accurate. For example, the input voltage sense pin may be eliminated since the input voltage may be sensed indirectly by sampling the phase voltage. A controller according to one embodiment enables easier setup (e.g., on hysteretic and ripple voltage regulators) since there is no need to tune the switching frequency for different filters and compensation values. A controller according to one embodiment allows hysteretic and synthetic ripple regulator topologies to run at a higher bandwidth (e.g., with more compensation ripple) without the compensation ripple affecting the switching frequency.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A steady state control circuit for controlling the steady state frequency of a variable frequency regulator, the variable frequency regulator providing a clock signal indicative of operating frequency and having a frequency control parameter for adjusting steady state operating frequency of the variable frequency regulator, said loop control circuit comprising:
   an open loop frequency control circuit which controls the frequency control parameter in an attempt to control steady state frequency of operation;
   a frequency detector having an input for receiving the clock signal and having an output providing a frequency sense signal indicative of operating frequency of the variable frequency regulator; and
   a comparator circuit which compares said frequency sense signal with a steady state frequency reference signal and which provides a frequency adjust signal indicative thereof;
   wherein the frequency control parameter is adjusted by said frequency adjust signal to control steady state frequency of the variable frequency regulator.

2. The steady state control circuit of claim 1, wherein said frequency detector comprises:
   a sawtooth generator having an input for receiving the clock signal and an output providing a sawtooth waveform indicative of operating frequency of the variable frequency regulator; and
   a filter which filters said sawtooth waveform to provide said frequency sense signal indicative of frequency of said sawtooth waveform.

3. The steady state control circuit of claim 2, wherein said sawtooth generator comprises:
   an edge detector having an input for receiving the clock signal and an output providing a pulse signal with momentary clock pulses;
   a switch having a control input coupled to said output of said edge detector, and having first and second switched terminals;
   a capacitor coupled between said control terminals of said switch; and
   a current source having an output coupled to said capacitor.

4. The steady state control circuit of claim 2, wherein said filter comprises a resistor-capacitor circuit which filters said sawtooth waveform to provide said frequency sense signal with a magnitude indicative of frequency of said sawtooth waveform.

5. The steady state control circuit of claim 1, wherein said frequency detector provides a frequency sense voltage, and wherein said comparator circuit comprises a transconductance amplifier having a first input receiving said frequency sense voltage, a second input receiving a frequency reference voltage, and an output providing said frequency adjust signal.

6. The steady state control circuit of claim 1, further comprising a combiner which combines said frequency adjust signal with the frequency control parameter to provide an adjust signal which is used to adjust the frequency control parameter.

7. The steady state control circuit of claim 6, wherein:
   said open loop frequency control circuit comprises a window voltage control circuit which develops a window current as the frequency control parameter which is provided to a window resistor for developing a window voltage having a magnitude which controls the operating frequency of the variable frequency regulator; and
   wherein said combiner comprises:
      a multiplier for multiplying said frequency adjust signal by said window current for providing an adjust current; and
      a current summing node which adds said adjust current to said window current to provide an adjusted window current to said window resistor.

8. A variable frequency regulator, comprising:
   an output inductor having first and second terminals;
   a power switching circuit which selectively applies an input voltage to said first terminal of said output inductor to develop an output voltage at said second terminal of said output inductor based on a clock signal;
   a variable frequency controller having an input receiving said output voltage and an output providing said clock signal for controlling said power switching circuit to regulate said output voltage;
   an open loop frequency control circuit, coupled to said variable frequency controller, which controls a frequency control parameter in an attempt to control steady state frequency of operation; and
   a closed loop frequency control circuit which adjusts said frequency control parameter according to a target steady state frequency of operation.

9. The variable frequency regulator of claim 8, wherein said closed loop frequency control circuit comprises:

a frequency detector having an input for receiving said clock signal and having an output providing a frequency sense voltage indicative of operating frequency of said variable frequency controller; and a comparator circuit which compares said frequency sense voltage with a frequency reference voltage and which provides a frequency adjust signal indicative thereof.

10. The variable frequency regulator of claim 9, wherein said frequency detector comprises:

a sawtooth generator having an input receiving said clock signal and an output providing a sawtooth waveform indicative of operating frequency; and a filter which filters said sawtooth waveform to provide said frequency sense voltage indicative of frequency of said sawtooth waveform.

11. The variable frequency regulator of claim 10, wherein said filter comprises a resistor-capacitor filter having a single low frequency pole.

12. The variable frequency regulator of claim 9, wherein said comparator circuit comprises a transconductance amplifier having a first input receiving said frequency sense voltage, a second input receiving said frequency reference voltage, and an output providing said frequency adjust signal.

13. The variable frequency regulator of claim 8, further comprising:

said open loop frequency control circuit comprising a window circuit which provides a window current to a window resistor to control a window voltage in an attempt to control said steady state frequency of operation; and a multiplier which multiplies said frequency adjust signal by the window current for providing an adjust current; and a current summing node which adds said adjust current to said window current to provide an adjusted window current to said window resistor.

14. The variable frequency regulator of claim 8, wherein:

said power switching circuit comprises a phase node coupled between electronic switches which are coupled between said input voltage and ground; and wherein said variable frequency controller comprises:

a synthetic ripple regulator controller which develops a ripple voltage indicative of ripple current through said output inductor based on said input voltage and said output voltage; and a sample circuit which samples voltage of said phase node for providing an input voltage sense signal provided to said synthetic ripple regulator controller.

15. A method of controlling the steady state frequency of a variable frequency regulator having a frequency control parameter for adjusting steady state operating frequency, said method comprising:

controlling the frequency control parameter using open loop control in an attempt to steady state frequency;

determining the operating frequency of the variable frequency regulator and providing a frequency sense signal indicative thereof;

comparing the frequency sense signal with frequency reference signal and providing a frequency adjust signal indicative thereof; and adjusting the frequency control parameter based on the frequency adjust signal to control steady state frequency.

16. The method of claim 15, wherein said controlling the frequency control parameter using open loop control comprises controlling the frequency control parameter based on input voltage and output voltage.

17. The method of claim 15, the variable frequency regulator including a clock signal indicating operating frequency, wherein said determining the operating frequency of the variable frequency regulator and providing a frequency sense signal indicative thereof comprises:

generating a sawtooth waveform based on the clock signal; and filtering the sawtooth waveform to provide a frequency sense voltage having a magnitude indicative of the operating frequency.

18. The method of claim 17, wherein said generating a sawtooth waveform comprises:

charging a capacitor with a constant current;

detecting operative edges of the clock signal and providing momentary pulses; and discharging the capacitor with each momentary pulse.

19. The method of claim 17, wherein said comparing the frequency sense signal with a steady state frequency reference signal and providing a frequency adjust signal indicative thereof comprises converting a difference between the frequency sense voltage and a frequency reference voltage to a frequency adjust current.

20. The method of claim 19, wherein the frequency control parameter comprises a window current, and wherein said combining the frequency adjust signal with the frequency control parameter to adjust the steady state frequency comprises:

multiplying the window current by the frequency adjust current to provide an adjust current; and adding the adjust current to the window current to provide an adjusted window current.

* * * * *